H. C. MOORES.
LIQUID DISPENSING DEVICE.
APPLICATION FILED JAN. 23, 1909.
951,829.
Patented Mar. 15, 1910.
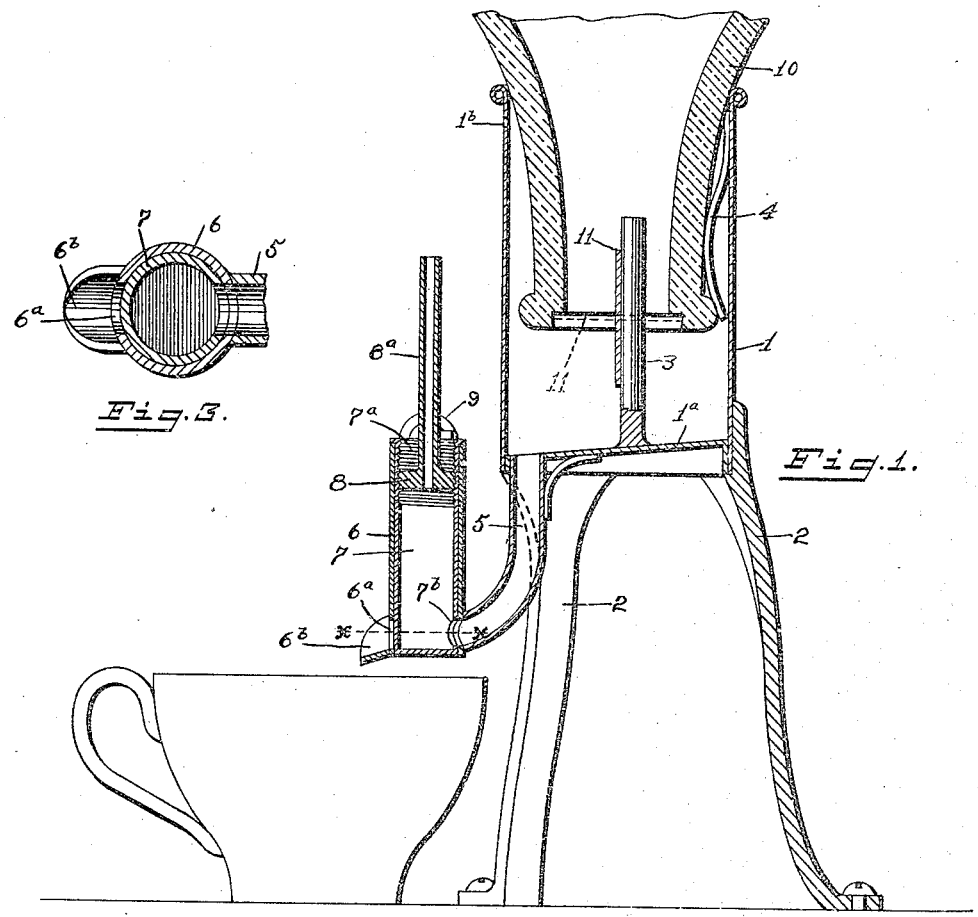
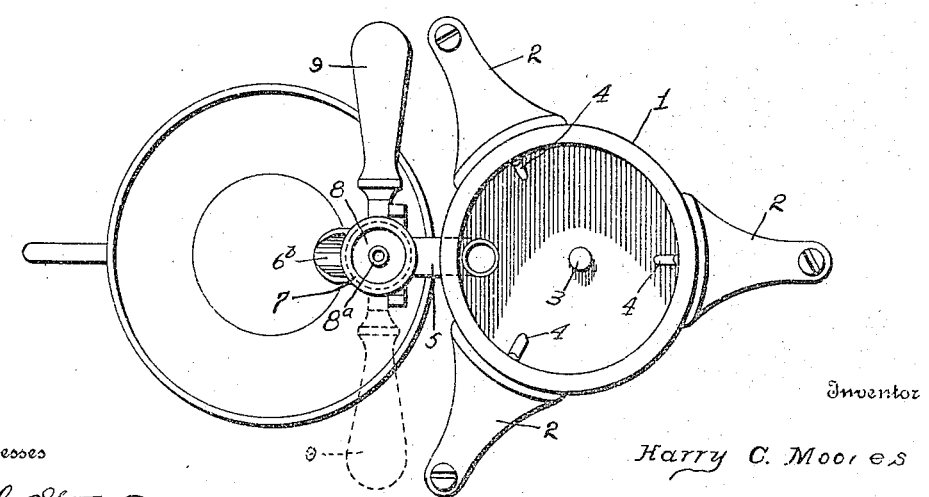
Witnesses
Carl Stoughton
A. L. Phelps
Inventor
Harry C. Moores
By C. C. Shepherd
Attorney

UNITED STATES PATENT OFFICE.

HARRY C. MOORES, OF COLUMBUS, OHIO.

LIQUID-DISPENSING DEVICE.

951,829.  Specification of Letters Patent.  Patented Mar. 15, 1910.

Application filed January 23, 1909. Serial No. 473,865.

*To all whom it may concern:*

Be it known that I, HARRY C. MOORES, a citizen of the United States, residing at Columbus, in the county of Franklin and State of Ohio, have invented certain new and useful Improvements in Liquid - Dispensing Devices, of which the following is a specification.

My invention relates to the improvement of cream dispensing devices, and the objects of my invention are to provide an improved construction of cream dispenser whereby cream may be discharged for coffee and similar drinks, in substantially uniform quantities; to so construct my improved dispensing device as to permit of regulating the amount of cream dispensed thereby at each discharge; to provide improved means in connection with my device for supporting a cream bottle in an inverted position and for removing the paper closure at the mouth of the bottle and to produce other improvements the details of which will be more fully pointed out hereinafter. These objects I accomplish in the manner illustrated in the accompanying drawing, in which:

Figure 1 is a central vertical section of my improved device showing the neck portion of a bottle supported therein, Fig. 2 is a plan view, and, Fig. 3 is an enlarged detail sectional view on line $x$—$x$ of Fig. 1.

Similar numerals refer to similar parts throughout the several views.

In carrying out my invention, I employ a cylindrical cup or casing 1 which is mounted upon suitable standards or supports 2. Rising from the bottom of the casing and slightly out of center therewith, is a vertical pin or fixed standard 3 and within the upper portion of the cup or casing, I secure the upper ends of a plurality of downwardly extending and inwardly curved spring members 4.

As indicated in the drawing, the bottom $1^a$ of the casing or cup 1, is inclined toward one side of the cup and leading from a point in the lowest point of said casing bottom, is a pipe or conducting tube 5. This tube 5 leads into and is rigidly connected with the lower end portion and rear side of a vertical tubular casing 6, the upper and lower ends of which are open. This casing has formed in its lower portion and at a point diametrically opposite the point of entrance of the pipe 5, an opening $6^a$ from about which projects outwardly and downwardly a suitable form of delivery spout $6^b$. Within the casing 6, I provide a close fitting, although movable cup-like valve 7, the inner surface of which in its upper portion is threaded as indicated at $7^a$. In the lower end portion of this cup valve 7, I form an opening $7^b$, which is adapted when the cup is properly turned, to be brought either into communication with the lower end of the pipe 5 or with the casing opening $6^a$. The upper end of the cup valve is closed by a closure plug 8, which is threaded therein and from which rises a vertical air pipe $8^a$, the central passage of which is extended through the center of the plug 8. With the upper end of the cup valve is connected a laterally extending operating handle 9.

In utilizing my device for the purpose of dispensing cream in uniform quantities, a cream or milk bottle of ordinary construction, the neck of which is indicated at 10, is inverted and has its neck portion inserted vertically into the cup 1 through its open upper end. When the bottle neck has been inserted to a sufficient depth within the cup or casing 1, it is obvious that it will be held in connection with said casing, by the engagement therewith of the spring members 4. As is well known, bottles of this kind are usually closed at their mouths, by a disk of paper or cardboard, such as is indicated at 11 and it is obvious that when the neck of the bottle is inserted within the cup or casing 1 as described, the contact of the upper end of the fixed pin 3 with said closure disk at one side of the center of the latter, will result in displacing the disk from its seat in the mouth of the bottle and usually results in turning said disk to the position indicated in full lines in Fig. 1 of the drawing, thereby opening the mouth of the bottle and permitting the cream to flow therefrom into the lower part of the casing 1 and downward through the pipe 5. The cup valve 7 being turned to the position shown in the drawing, it is obvious that cream from the casing, which passes through the pipe 5, will enter and rise within the cup valve 7 and tube $8^a$ to a height equal to the height of the cream in the casing 1, which height will be substantially at the level of the lower end of the bottle neck. The cup-valve being thus filled with cream, it is obvious that by turning the handle 9 of said cup valve to the position indicated in dotted lines in Fig. 2 of the drawing, said cup valve will be so turned in its tubular casing as to close the entrance to the pipe 5 and to bring the opening $7^b$ into communication with the casing opening $6^a$, thereby permitting the cream within the cup valve to run outward through the spout $6^b$ into a coffee pot or other receptacle. By again turning the handle back to the position shown in full lines in Fig. 2 of the drawing, it is obvious that the cup valve may be again quickly filled with cream from the casing 1 and dispensed therefrom in the manner described. By the operation described, it will readily be seen that cream will be discharged from the cup valve in uniform quantities, thus insuring the use of substantially the same amount of cream for each cup of coffee, tea or other similar drink. By turning the tubular air pipe $8^a$ upward or downward within the upper portion of the cup valve, it is obvious that the capacity of the cup valve may be increased or decreased as desired, thereby providing for the discharge of a greater or less amount of cream from said cup valve.

It will be understood that the cream which is discharged from the bottle neck into the casing 1 will by pressure of the atmosphere be prevented from rising to the top of said casing and overflowing therefrom and in case sufficient air is not supplied for this purpose, from the top of the casing, I may form the upper portion of the latter with a desirable number of perforations $1^b$.

From the construction shown and described, it will readily be understood that by the use of my improved cream dispenser, cream may be discharged into cups or other receptacles in predetermined uniform quantities.

What I claim, is:

1. In a cream dispenser, the combination with a cream supply receptacle adapted to receive and support the neck of an inverted bottle, of a plurality of spring members secured to the inner walls of said receptacle, a stopper removing member projecting upwardly from the bottom of said receptacle, a downwardly and outwardly extending conduit leading from the bottom of said receptacle, a casing supported by said conduit, a rotative hollow valve located therein and having a port adapted to be brought into alternate communication with the conduit and with an outlet port of said casing, and means for varying the cubic capacity of said hollow valve.

2. In a cream dispenser, the combination with a cream supply receptacle adapted to receive and support the neck of an inverted bottle, of a plurality of spring members secured to the inner walls of said receptacle, a stopper removing member projecting upwardly from the bottom of said receptacle, a downwardly and outwardly extending conduit leading from the bottom of said receptacle, a casing supported by said conduit, a rotative hollow valve located therein and having a port adapted to be brought into alternate communication with the conduit and with an outlet port of said casing, and means for varying the cubic capacity of said hollow valve, said means comprising a plug threaded into the otherwise open upper end of said hollow valve and an extension projecting upwardly therefrom, both the plug and the extension having an opening formed therethrough to form an air inlet for the hollow valve, the upper end of said extension being above the upper surface of the cream in the receptacle.

In testimony whereof I affix my signature in presence of two witnesses.

HARRY C. MOORES.

Witnesses:
C. C. SHEPHERD,
L. CARL STOUGHTON.